(12) United States Patent
Vidyarthi et al.

(10) Patent No.: US 10,623,288 B2
(45) Date of Patent: *Apr. 14, 2020

(54) METHODS AND SYSTEMS FOR TRANSPORTATION VESSEL NETWORK COMMUNICATION SERVICE ANOMALY DETECTION

(71) Applicant: Viasat, Inc., Carlsbad, CA (US)

(72) Inventors: Shreyas Vidyarthi, San Diego, CA (US); Daniel Tian, San Diego, CA (US); Karan S. Lala, Temecula, CA (US); Guiseppie R. Pagliaro, Garden Grove, CA (US); Jonathan B. Perapalanunt, Cerritos, CA (US)

(73) Assignee: Viasat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,853

(22) Filed: Dec. 21, 2018

(65) Prior Publication Data
US 2019/0123987 A1   Apr. 25, 2019

Related U.S. Application Data

(63) Continuation of application No. 15/253,642, filed on Aug. 31, 2016, now Pat. No. 10,193,774.
(Continued)

(51) Int. Cl.
*H04L 12/26* (2006.01)
*H04L 12/24* (2006.01)
(Continued)

(52) U.S. Cl.
CPC .............. *H04L 43/08* (2013.01); *B64D 45/00* (2013.01); *B64D 45/0059* (2019.08); *G06F 16/29* (2019.01); *H04L 41/0631* (2013.01); *H04L 67/12* (2013.01); *G08G 5/0013* (2013.01); *H04L 41/5009* (2013.01); *H04L 43/028* (2013.01)

(58) Field of Classification Search
None
See application file for complete search history.

(56) References Cited

U.S. PATENT DOCUMENTS 6,201,797 B1   3/2001   Leuca et al.
6,285,878 B1   9/2001   Lai
(Continued)

*Primary Examiner* — Thomas J Dailey
(74) *Attorney, Agent, or Firm* — Holland & Hart LLP

(57) ABSTRACT

Methods and systems for detecting an anomaly with a communication service provided to a transportation vessel along a travel route are disclosed. In some aspects, performance metrics are obtained for a monitored vessel while the travel is in progress. Historical travel routes are identified having characteristics similar to those of the monitored vessel's travel route. Corresponding performance metrics of the historical travel routes may be aggregated via mean or median operations, and the results compared to equivalent metrics of the monitored vessel. If accumulated negative variances between the monitored vessel's performance and the historical travel route's performance exceed a threshold, an anomaly may be determined to exist. In this case, the systems and methods may generate an alert in various forms, including email, text, or selective network commands to various networking components, including, for example, instructing networking equipment on board the monitored vessel to perform a power cycle operation.

27 Claims, 9 Drawing Sheets

Related U.S. Application Data

(60) Provisional application No. 62/212,177, filed on Aug. 31, 2015.

(51) Int. Cl.
  *H04L 29/08* (2006.01)
  *B64D 45/00* (2006.01)
  *G06F 16/29* (2019.01)
  *G08G 5/00* (2006.01)

(56) References Cited

U.S. PATENT DOCUMENTS

| | | |
|---|---|---|
| 6,788,935 B1 | 9/2004 | McKenna et al. |
| 8,341,298 B2 | 12/2012 | Wilber et al. |
| 8,457,627 B2 | 6/2013 | Lauer |
| 8,798,922 B2 | 8/2014 | Tillotson et al. |
| 9,490,891 B2 | 11/2016 | Frerking et al. |
| 2010/0311335 A1 | 12/2010 | Durand et al. |
| 2014/0222998 A1 | 8/2014 | Vasseur |

| | Source | Dest | Departure date/time | Route Length | Vessel Type | Equipment Type | Operator |
|---|---|---|---|---|---|---|---|
| weight | .15 | .15 | .2 | .1 | .1 | .5 | .25 |
| Route 1 | SRC1 | DST1 | T1 | L1 | 737 | E1 | OP1 |
| Route 2 | SRC1 | DST2 | T2 | L2 | 747 | E1 | OP2 |
| Route 3 | SRC2 | DST3 | T3 | L1 | A320 | E2 | OP3 |
| Route 4 | SRC2 | DST2 | T4 | L3 | 737 | E1 | OP1 |
| Route 5 | SRC1 | DST1 | T5 | L4 | A320 | E2 | OP4 |
| Route 6 | SRC2 | DST1 | T6 | L5 | 737 | E3 | OP1 |
| … | … | … | … | … | … | … | … |

FIG. 4

|  | SNR 535a | # of Dropped Packets 535b | # of Accel Packets 535c | # of PEDs 535d |
|---|---|---|---|---|
| Weight | W1 | W2 | W3 | W4 |
| NVI | - 508a | + 508b | - 508c | - 508d |
| Monitored Vessel (MV) | SNR-1 511a | DP-1 511b | AP-1 511c | PED-1 511d |
| Similar Route #1 | SNR-S1 | DP-S1 | AP-S1 | PED-S1 |
| Similar Route #2 | SNR-S2 | DP-S2 | AP-S2 | PED-S2 |
| Similar Route #3 | SNR-S3 | DP-S3 | AP-S3 | PED-S3 |
| Aggregated Similar Routes (ASR) | SNR-Agg 531a | DP-Agg 531b | AP-Agg 531c | PED-Agg 531d |
| NV between MV and ASR | NV-SNR 536a | NV-DP 536b | NV-AP 536c | NV-PED 536d |
| Aggregated NV | (NV-SNR)+(NV-DP)+(NV-AP)+(NV-PED) 541 | | | |

FIG. 5 ly characters.
METHODS AND SYSTEMS FOR TRANSPORTATION VESSEL NETWORK COMMUNICATION SERVICE ANOMALY DETECTION

CROSS REFERENCE TO RELATED APPLICATIONS

This application is a continuation of U.S. patent application Ser. No. 15/253,642 filed Aug. 31, 2016 and entitled, "Methods and Systems For Transportation Vessel Network Communication Service Anomaly Detection" which claims the benefit of U.S. Provisional Application 62/212,177, filed Aug. 31, 2015, and entitled "In-Flight Wi-Fi Service Anomaly Detection and Alerting Mechanisms"; each of which are assigned to the assignee hereof and incorporated by reference herein in its entirety.

FIELD

Embodiments relate generally to mobile communications systems.

BACKGROUND

Traditionally, high performance networks, such as broadband networks, were available only in fixed locations with access to substantial infrastructure, with the technical and financial resources available to provide the specialized hardware resources necessary to enable high bandwidth. Later, high performance networks became available in residential environments. More recently, high performance networks are becoming available for mobile platforms, including cell phones, and within transportation devices, such as automobiles, trains, and airplanes. As a result, these high performance networks have become essential to many aspects of daily life.

As high performance networking capabilities have been made available to mobile platforms, managing network performance and user satisfaction for these networks has increased in complexity. Therefore, improved methods of characterizing the performance of network communications services provided to mobile platforms are needed.

BRIEF SUMMARY

Disclosed are methods and systems for detecting anomalous performance of a communication service provided to a mobile platform, such as an aircraft. As the number of aircraft flights utilizing network communications services has increased, it has become increasingly difficult to detect issues with performance of the network communications services on any one particular flight. Additionally, some aircraft flights are of relatively short duration, which places an emphasis on real-time issue detection for network communication services.

The disclosed methods and systems solve these problems by providing accurate historical and real-time anomaly detection for a communication service provided to a mobile platform. The disclosed methods and systems may also integrate alerting mechanisms that can alert network operators when an anomaly is detected with a communication service. These anomalies may be caused, for example, by a network utilized to provide the communication service, or with equipment on board the mobile platform itself. The methods and systems employ specialized algorithms and analytic processes for relevant performance metrics associated with a monitored communication service and also those of historically similar flights. The system may include a database that includes data for previous non-anomalous travel routes, including metrics collected when those trips occurred. Characteristics of the travel routes may also be stored in the database. These may include route information for the routes (such as source and destination), indications of when the travel occurred, information on an entity providing the travel route, (such as a particular airline name), and other characteristics.

In some aspects, anomalous communication service performance may be identified by collecting performance metrics for a monitored communication service in real time from a vessel along it's travel route (such as from an airplane as it proceeds along a flight path). Characteristics of the vessel's travel are utilized to identify a subset of similar historical and non-anomalous trips on similar travel routes in a real-time dynamic manner. In some aspects, this historical information may be identified from the database discussed above. Characteristics used to identify similar travel routes may include a travel route's origin city and destination city, a departure date and/or time, a duration or length of the trip, a type of vessel performing the travel, a network equipment type operated by the vessel of deliver the network communication service, and an operator for the trip (such as an airline). In some aspects, a K-Nearest Neighbor and/or K-means clustering method may be utilized to identify the similar travel routes from a database, which may include trips (e.g. airline flights) having characteristics both similar and dissimilar to that of the monitored vessel's travel.

Once the similar travel routes (e.g. aircraft flights) are identified, corresponding performance metrics of the historical travel routes (e.g. historical aircraft flights) may be aggregated on a per time-instance basis offset to the beginning of the travel, such that the similar travel route data is integrated into a single set of metrics that represent an average or median communication service performance across the similar travel routes. There may be a corresponding metric collected from the monitored vessel for each of the aggregated historical travel route metrics.

Negative variances between the monitored vessel's performance metrics as it proceeds along its travel route and the aggregated similar travel route metrics may be created. In some aspects, a negative variance may represent a point in the monitored vessel's travel with worse communication service performance than a historical average represented by the corresponding aggregated metric of the historically similar travel routes. For example, when comparing a data rate metric, a negative variance may occur when the monitored vessel's data rate is lower than the aggregated historically similar vessels on similar travel routes data rate. When evaluating a dropped packet metric, a negative variance may occur when the monitored vessel's dropped packet metric is higher than the aggregated similar vessels on similar travel routes dropped packet metric.

Thus, each type of performance metric for a communication service may have a different method of computing a corresponding negative variance, or even whether a negative variance is present. In some aspects, these different methods may be indicated in the historical database discussed above. For example, the database may store an indication for some types of metric, that a negative variance occurs when a monitored vessel's metric exceeds a corresponding aggregated historically similar vessel's on similar travel routes metric. The database may also store other indicators for other types of metrics indicating that when a monitored aircraft metric is below the corresponding aggregated historically similar travel route metric.

In some aspects, after the negative variances are determined, the negative variances across the metric types are then aggregated into fewer metrics, for example, a single metric in some aspects.

Furthermore, the metrics described above may be determined for multiple time periods. For example, metrics for the monitored vessel may be collected periodically as the vessel proceeds along its route. Metric data for the similar travel routes may also include metrics collected over time as those vessels traveled along their respective routes. Some aspects may synchronize the in-route metrics and historical metrics so as to compare metrics representing an equivalent offset from the start of their respective routes.

These time series of metrics may be compared for each metric in each respective series. The result may be a time series of accumulated negative variance metrics. This time series may be provided to a convolution filter. The filtered time series may be evaluated via a sliding window, with a threshold utilized to determine whether an anomaly has occurred. For example, if the filtered negative variance data exceeds a threshold for some number of points in the time series, an anomaly may be determined. The system may then perform one or more alerting functions in response to detecting the anomaly.

BRIEF DESCRIPTION OF THE DRAWINGS

In the figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

FIG. 4 is an exemplary data table that may be included in the metrics database illustrated in FIG. 2.

FIG. 5 shows a metrics table including metrics that may be determined by the compute resources of the data center discussed above.

DETAILED DESCRIPTION

In the following description, numerous specific details are set forth to provide a thorough understanding of the present disclosure. However, one having ordinary skill in the art should recognize that the disclosure can be practiced without these specific details. In some instances, circuits, structures, and techniques have not been shown in detail to avoid obscuring the present disclosure.

Figure 1:
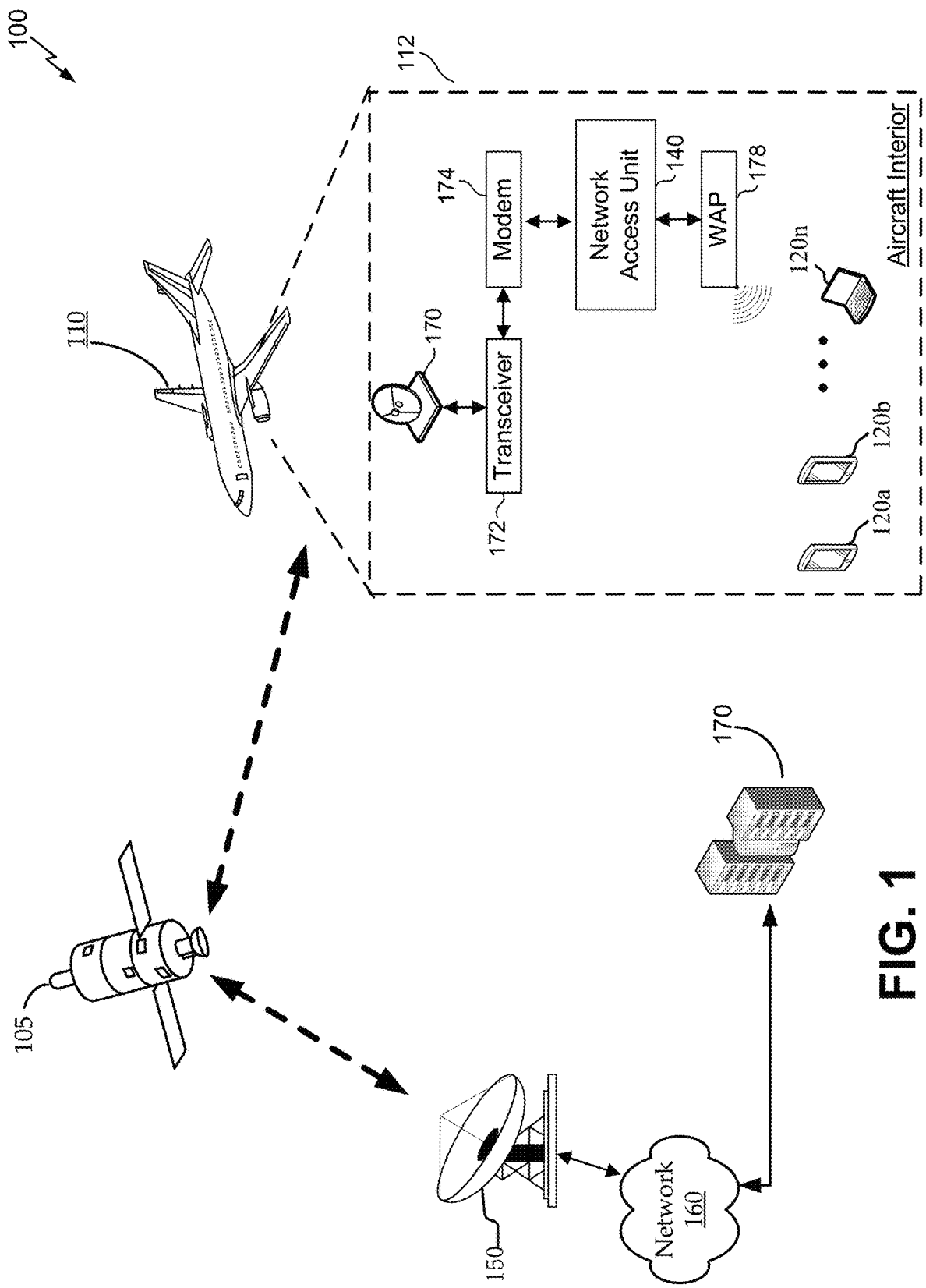
FIG. 1 shows a communications system including a detailed block diagram of one example embodiment of a vessel.

FIG. 1 shows a view of a communications system 100 including a detailed block diagram of one example embodiment of a vessel 110. The communications system 100 may provide one or more communications services between the vessel 110 and the network 160. For example, in some aspects, the one or more communications services may include a text messaging service, audio or video streaming service, web browsing service, email service, or any other digital communications service.

The vessel 110 is in communication with a data center 170 via the network 160. The data center 170 may include one or more electronic hardware computers, discussed below. The vessel 110 may transmit link performance information indicating one or more network performance metrics for a communications service provided between the vessel 110 and the network 160 by the communications system 100. The one or more network performance metrics may reflect performance of a communications service provided to the vessel 110. The link performance information may be transmitted by the vessel 110, to a satellite 105, to the gateway 150, to the network 160 and then to the data center 170 and the one or more electronic hardware computers within.

In the illustrated embodiment, the vessel 110 is an airplane. Alternatively, the vessel 110 may be other than an airplane, such as another type of aircraft such as a helicopter, drone, a blimp, a train, bus, a cruise ship, other type of vehicle, etc. As illustrated, the network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

The vessel 110 can include a two-way communication system 112 to facilitate bidirectional communication with the satellite 105. In the illustrated embodiment, the two-way communication system 112 includes an antenna system 170, transceiver 172, modem 174, network access unit 140, wireless access point (WAP) 178, and one or more personal electronic devices 120a-n.

The two-way communication system 112 can provide for reception of a forward downlink signal from the satellite 105 and transmission of a return uplink signal to the satellite 105 to support two-way data communications between personal electronic devices 120a-n within the transport craft 110 and the terrestrial network 160. The personal electronic devices 120 can include smartphones, laptops, tablets, netbooks, and the like brought onto the transport craft 110 by passengers or crew. As further examples, the personal electronic devices 120 can include passenger seat back systems or other devices on the transport craft 110, including passenger and/or crew devices. The personal electronic devices 120 can communicate with the network 160 via a communication link that can be wired and/or wireless. The communication link can be, for example, part of a local area network such as a wireless local area network (WLAN) supported by WAP 178. One or more WAPs 178 can be distributed about the transport craft 110, and can, in conjunction with a network access unit 140, provide traffic switching and routing functionality; for example, as part of a WLAN extended service set (ESS), etc.

In operation, the network access unit 140 may provide data generated by one or more of the personal electronic devices 120*a-n*, and additionally may provide network performance metric data regarding the communications service between the network 160 and the personal electronic devices 120*a-n* to the modem 174, which modulates the PED data and the performance metric data (e.g., via a transmit intermediate frequency (IF) signal) for delivery to the transceiver 172. The transceiver 172 can upconvert and then amplify the modulated data to generate a return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 140 for routing to the personal electronic devices 120. The modem 174 can be integrated with the network access unit 140, or can be a separate component in some examples.

The network access unit 140 may include, in some aspects, an electronic hardware processor and an electronic hardware memory, and one or more network interfaces. The electronic hardware processor may be configured to perform a variety of functions associated with monitoring the network performance of the communications system 100 with respect to the vessel 110. Furthermore, the network access unit 140 may be configured to receive one or more commands from the data center 170. For example, the network access unit 140 may be configured to receive and process a command from the data center 170 to perform a power cycle operation. The power cycle operation may cause the network access unit 140 to reset, such that electronic initialization functions within the network access unit 140 are performed, and the network access unit 140 is returned to an initialized state as a result of the power cycle command.

In some aspects, the network access unit 140 may be configured to generate one or more communications service performance metrics representing a signal quality metric of the communication service. For example, the communications service performance metrics may include one or more of forward link and/or return link data rates, an indication of a number of dropped packets over time, an indication of a number of accelerated packets over time, a number of personal electronic devices and/or sessions served by a communications service provided to the vessel 110, and a signal to noise ratio of a forward link and/or return link signal communicated between the satellite and vessel 110. A number of accelerated packets may indicate a number of packets transmitted to a personal electronic device 120 from an acceleration server or cache server. For example, the communications system 100 discussed with respect to FIG. 1 may employ one or more content acceleration methods. These methods may include prefetching content from the network 160 before it is requested by one or more of the personal electronic devices 120. In some aspects, the number of accelerated packets may also include packets transmitted to a personal electronic device 120 via the TCP windowing technique, without necessarily being cached in a server or prefetched.

The network access unit 140 may be further configured to periodically re-determine one or more of the metrics described above. For example, in some aspects, a moving average of one or more of the metrics may be determined at a periodic interval. In some aspects, the network access unit 140 may be further configured to periodically communicate, via the communications system 100, one or more of the metrics to the data center 170.

The network access unit 140 may also be configured to monitor a location of the vessel 110 and to periodically report the location of the vessel 110 using the communication system 100 to the data center 170. In some aspects, the network access unit 140 may associate one or more of the network performance metrics with one or more vessel locations, and report the association to the data center 170. The network access unit 140 may also be configured to maintain a timer indicating a time into a current flight of the vessel 110. This information may also be associated with one or more of the performance metrics discussed above, and the timer information and association information may be transmitted to the data center 170 along with the one or more communication service performance metrics discussed above.

In some aspects, the network access unit 140 may also be configured to provide one or more flight characteristics for a flight provided by the vessel 110 to the data center 170. For example, the network access unit 140 may, in some aspects, be in network communication with a flight management computer, and may receive information regarding an origin/source, destination, flight time, expected duration of the flight, or other characteristics of the flight provided by the vessel 110. The NAU 140 may then transmit this information the data center 170 in some aspects.

Figure 2:
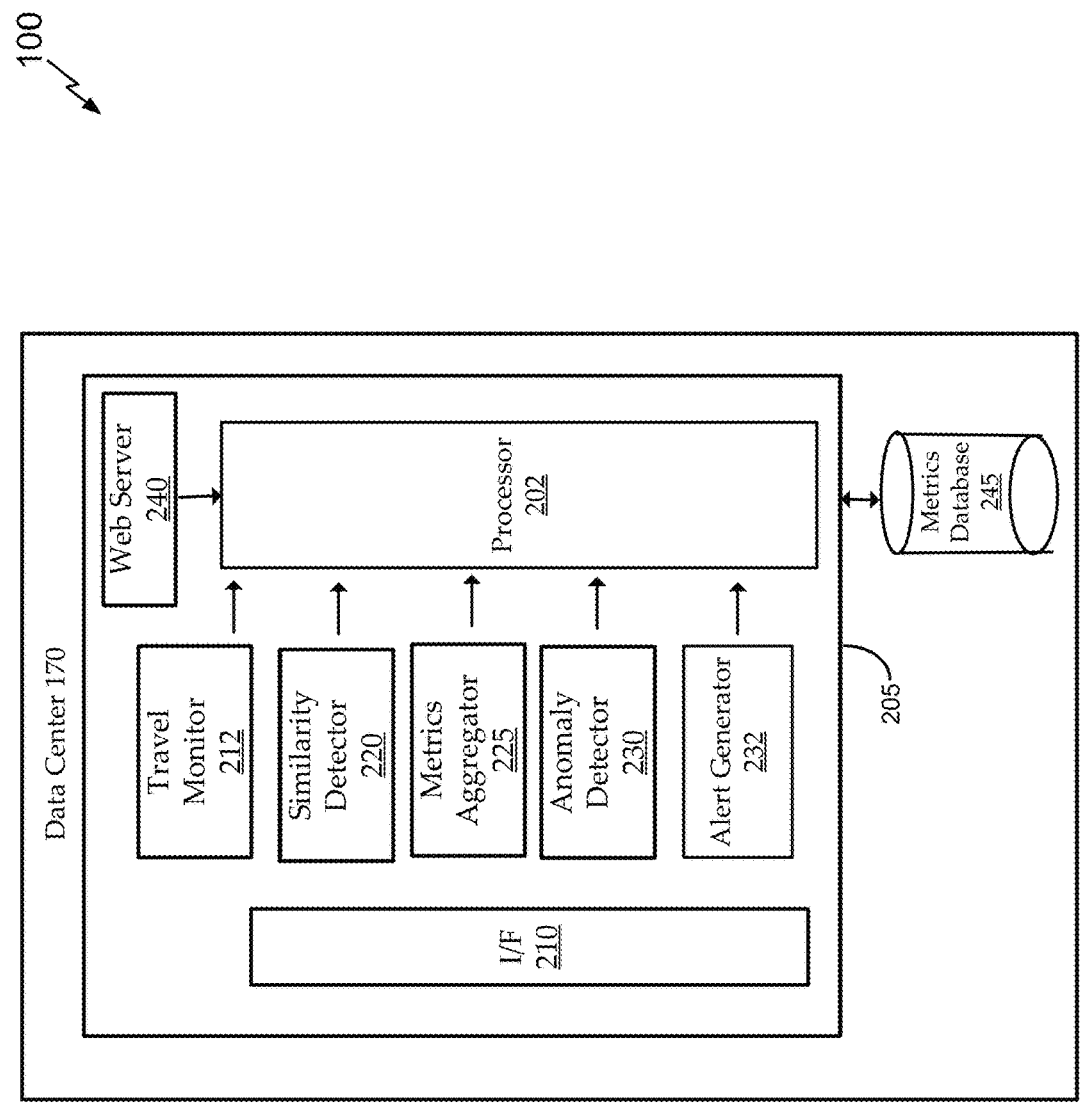
FIG. 2 shows another view of the communications system including a detailed block diagram of one example embodiment of the data center.
Figure 2:
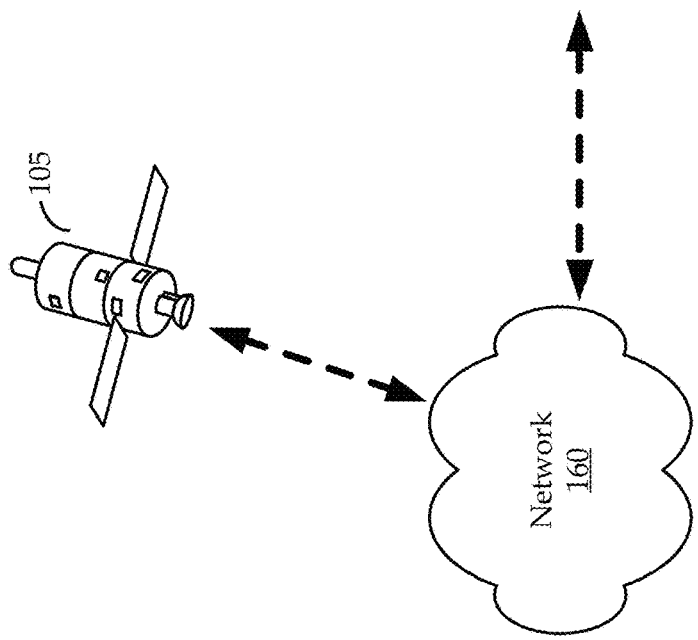

FIG. 2 shows another view of the communications system 100 including a detailed block diagram of one example embodiment of the data center 170. Many other configurations of the data center 170 are possible having more or fewer components. As shown in FIG. 2, the data center 170 includes at least one hardware computer 205. In some aspects, the hardware computer 205 may be comprised of multiple physical computers, which may be geographically distributed across a wide area and connected via a network. In some aspects, the hardware computer 205 may be a single hardware computer contained within a single physical enclosure. In some aspects, the hardware computer 205 may be comprised of multiple physical enclosures, some of which are within the data center 170 and some of which are geographically distributed away from the data center 170. Additionally, the functionalities described with respect to the hardware computer 205 can be distributed among the components in a different manner than described herein Consistent with FIG. 1, in some embodiments, link performance data for one or more vessels may be received by the satellite 105 for example, and then received by the data center 170 and the electronic hardware computer 205 within the data center 170. The illustrated aspect of the electronic hardware computer 205 includes an electronic hardware processor 202, and a network interface 210. The processor 202 may be in communication with the network interface 210 via an electronic bus within the electronic hardware computer 205 (not shown). The processor 202 may communicate with the network interface 210 to transmit and/or receive packets over a network, such as a network providing connectivity to the vessel 110 discussed above with respect to FIG. 1.

The electronic hardware computer 205 also includes travel monitor 212, similarity detector 220, metrics aggregator 225, anomaly detector 230, an alert generator 232, and a web server 240, which may be portions of a volatile or stable storage, such as a virtual or physical memory space accessible to processor 202. The travel monitor 212, similarity detector 220, metrics aggregator 225, anomaly detector 230, alert generator 232, and the web server 240 may include binary data defining instructions that configure the processor 202 to perform various functions. For example, the travel monitor 212 may include instructions that configure the processor 202 to collect one or more performance metrics for a communication service provided to a monitored vessel, such as an aircraft flight, and store the metrics in the metrics database 245. Instructions in the similarity detector 220 may configure the processor 202 to search the metric database 245 for similar travel routes done by vessels similar to a vessel being monitored by the travel monitor 212. The similarity detector 220 may employ nearest neighbor classifications and/or k-means clustering to identify the similar trips based on characteristics of the vessel being monitored and its travel route and characteristics of travel routes performed in the past by other vessels.

The metrics aggregator 225 may aggregate metrics from the similar travel routes detected by the similarity detector 220. For example, as discussed below, in some aspects, the metrics aggregator 225 may configure the processor 202 to generate a mean or median of corresponding metrics from the similar travel routes identified by the similarity detector 220. The metrics aggregator may then determine negative variances between metrics of the vessel being monitored as it proceeds along its travel route, and the mean/median of corresponding metrics from the similar vessels as they proceeded along their respective travel routes. These negative variances may themselves then be aggregated to produce summary metrics (for example, one metric) representing a difference in performance of a communication service of the monitored vessel and historically similar vessels on historically similar travel routes. In some aspects, aggregation of negative variances may be divided by the duration of the trip to that point to provide an average negative variance experienced during the trip. Instructions in the alert generator 232 may then generate one or more alerts if the metrics created by the metrics aggregator indicate performance of the communication service provided to the vessel being monitored is anomalous.

The web server 240 may include instructions that configure the processor 202 to provide a web-based user interface. The web-based user interface may provide configuration of the anomaly detection methods discussed herein. For example, the web-based user interface may allow for the configuration of one or more of the threshold values discussed herein. Additionally, the web-based user interface may provide reports indicating values for the metrics collected by the systems described herein.

Figure 3A:
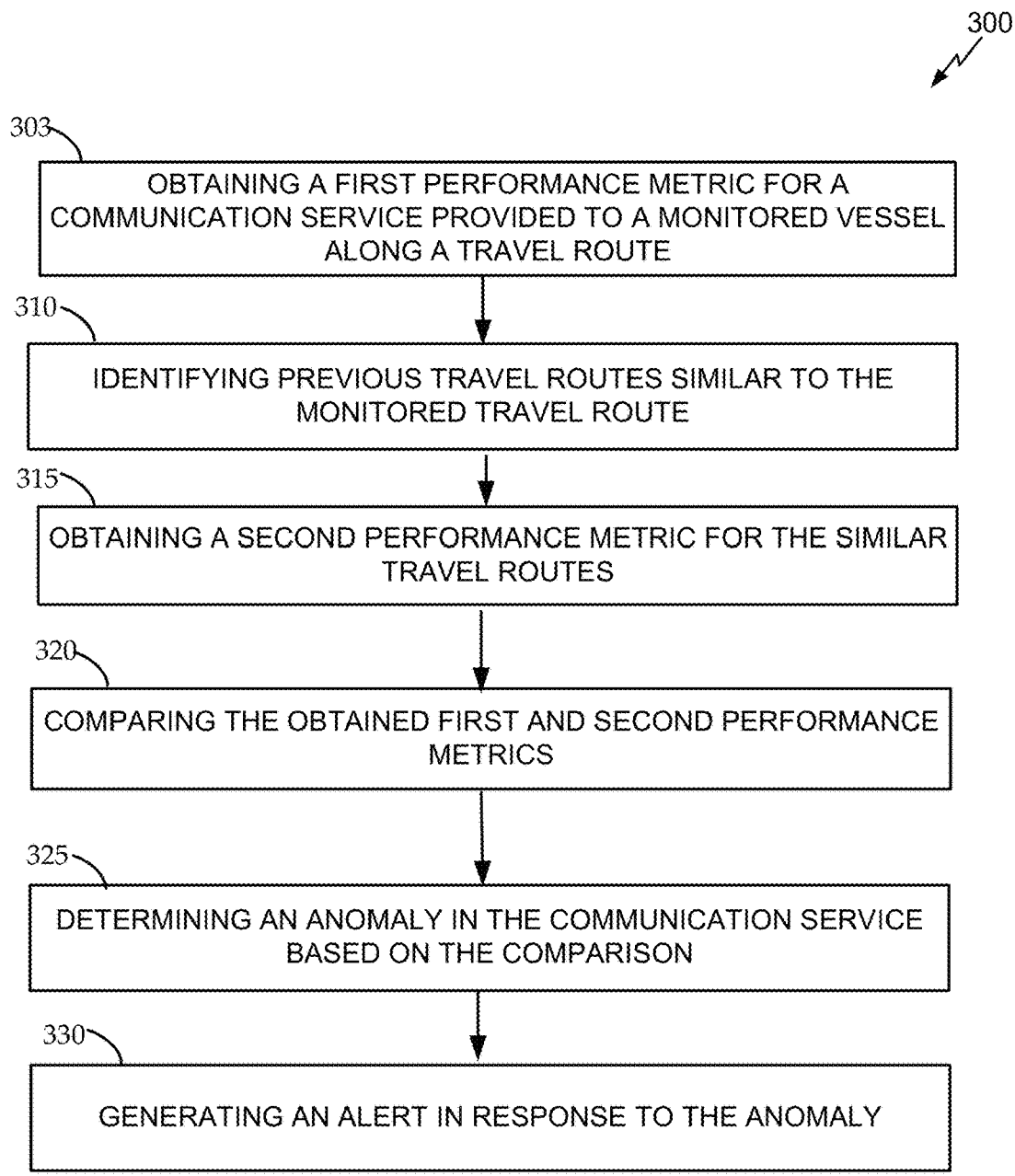
FIG. 3A is a flowchart of a method for detecting an anomaly in a network.

FIG. 3A is a flowchart of a method for detecting an anomaly in a network. In some aspects, one or more of the functions discussed below with respect to process 300 and FIG. 3A may be performed by the processor 205, configured by instructions stored in one or more of the travel monitor 212, similarity detector 220, metrics aggregator 225, anomaly detector 230, and the alert generator 232.

In block 303, a first performance metric for a communication service provided to a monitored travel route of a transportation vessel is obtained. For example, in some aspects, the communication service is provided along an airline flight path to an airplane. In some aspects, the first performance metric may be based on one or more of a forward and/or return link data rate of the communication service, a signal to noise ratio of a return link and/or forward link signal used to provide the communication service over a period of time, a number of dropped packets over a period of time, a number of personal electronic devices serviced and/or a number of sessions services by the communication service over a period of time, and a number of packets accelerated over a period of time. In some aspects, the first performance metric may include a plurality of performance metrics. In some aspects, a time series of the first performance metric may be obtained. In other words, the first performance metric may be obtained at multiple points during the monitored vessel's trip along its travel route. In some aspects, block 303 may be performed by instructions in the travel monitor 212, along with at least the electronic hardware processor 202, both of which are discussed above with respect to FIG. 2.

In block 310, previous or historical travel routes that are similar to the travel route of the monitored vessel are identified. For example, in some aspects, previous or historical aircraft flights similar to a monitored aircraft flight are identified. As discussed above, in some aspects, travel routes may be determined to be similar based on comparisons between a route or path of the travel route (such as that defined by a source and destination pair for the travel route), a length or duration of the travel route, a time of day of the travel, a day of the week of the travel route, and a seasonality of the travel route (e.g. month). Thus, the travel route as described herein may include more than just an actual route of travel, but may also include other defining characteristics of a particular trip along a physical travel route, to include one or more of the characteristics defined above. Thus, a trip from San Diego to Los Angeles on a particular Wednesday is a different travel route as defined herein than a second trip from San Diego to Los Angeles on a particular Friday for example. In some aspects, block 310 may perform a nearest neighbor analysis of the monitored flight's travel route to historical travel routes of other vessels based on one or more of the characteristics identified above to identify previous trips similar to the monitored vessel's trip. In some aspects, one or more of the functions discussed above with respect to block 310 may be performed by instructions in the similarity detector 220, along with at least the electronic hardware processor 202, both of which are discussed above with respect to FIG. 2.

In various aspects, comparison models may be defined dynamically as a monitored vessel proceeds along its route. For example, usage parameters may be dependent on seasonality. To accommodate complex seasonal behavior, a K-nearest neighbor method may be utilized to find historical sets that are in a closest set of neighbors (for a given set of parameters) to the monitored vessel. In some aspects, multiple models (of mean/median for example) based on aggregations of different travel route characteristics (such as hour of day, or day of week, or day of month) may be utilized. In some aspects, scores generated by the multiple models may be combined linearly to form a model for comparison to the monitored vessel.

In some aspects, multiple subsets of data for fixed characteristics of historical trips such as operator, source-destination pair, and time of day are used to pre-compute multiple models. Model selection is then performed based on the features of the monitored vessel's travel route and these models are applied to detect anomalies.

In some aspects, multiple sets of similar travel routes may be obtained for the monitored vessel, with each of the multiple sets having different travel route characteristics in common with the travel route of the monitored vessel. For example, a first set of similar travel routes may be based on an operator, route, and time of day of the monitored vessel. A second set of similar travel routes may be based on an operator, route, and day of the week of the monitored vessel.

A third set of travel routes may be obtained based on the operator, route (source/destination pair), and month of travel.

In some aspects, the number of similar travel routes identified in block 310 may be limited. For example, in some aspects, the number of similar travel routes may be limited to 10, 20, 25, 50, 100, 250, 500, 1,000 or any number of similar travel routes.

While the exemplary discussion of block 310 provides one example of a monitored vessel as an aircraft flight, the disclosed methods and systems may be applied, in some other aspects, to travel events utilizing other transportation vessels, such as car rides, bus trips, railroad trips, etc.

In block 315, a second performance metric is obtained for the similar previous travel routes identified in block 310. For example, in some aspects, the similar previous travel routes may be represented by previous similar aircraft flights. The second performance metric may also be based on one or more of a forward and/or return link data rate of the communication service, a signal to noise ratio of a return link and/or forward link signal used to provide the communication service over a period of time, a number of dropped packets over a period of time, a number of personal electronic devices and/or sessions serviced by the communication service over a period of time, and a number of packets accelerated over a period of time. In some aspects, block 315 may determine an average or median value of the above parameters from each of the similar aircraft flights to generate the second metric.

In some aspects, one or more average or median values of the parameters above may be combined to generate the second performance metric. In some aspects, the second performance metric may include a plurality of performance metrics. In some aspects, a time series of the second performance metric(s) may be obtained. In other words, the second performance metric(s) may be obtained at multiple points during the similar travel routes (e.g. aircraft flights). In some aspects, one or more of the functions discussed above may be performed by instructions in the metric aggregator 225, along with the electronic hardware processor 202, both of which are discussed above with respect to FIG. 2.

In aspects that generate multiple sets of similar travel routes as discussed above, block 315 may include generating intermediate performance metrics for each of the similar travel route sets. For example, each intermediate performance metric for a similar travel route set may determine a median or mean measurement for the travel routes in the set. These intermediate metrics may then be combined to generate the second performance metric. In some aspects, the intermediate metrics may be combined according to individual weights. For example, some aspects may weigh similar travel routes occurring at the same time of day as a monitored vessel's travel route more heavily than trip occurring at different times of the day, but on the same day of the week as the monitored vessel's trip. Alternatively trips occurring on the same route and with the same operator, and during the same month of the year may be weighted more heavily than trips with the same operator, same route, and same time of day (regardless of month). The intermediate metrics for the multiple sets of similar travel routes may be averaged, or a median taken, based on different weights associated with each similar flight set. The second performance metric may be based, in some aspects, on the weighted combination of the intermediate metrics.

In block 320, the first and second performance metrics are compared. In some aspects, comparing the first and second performance metrics may include obtaining a first plurality of performance metrics for the communication service provided to the monitored vessel over periods of time, and obtaining a second plurality of performance metrics aggregating (via mean or median operations for example) corresponding metrics for the similar previous trips over second periods of time, and computing negative variances between the first plurality of performance metrics and corresponding metrics in the second plurality of performance metrics. Negative variances for different types of performance metrics may be aggregated in some aspects. For example, negative variances relating to one or more of a forward link data rate, return link data rate, a number of dropped packets, a number of accelerated packets, a number of personal electronic devices and/or sessions, a signal to noise ratio may be aggregated to generate a single metric. In some aspects, the negative variances for different performance metrics may be aggregated according to different weights. For example, a negative variance of a signal to noise ratio performance metric may be given a different weight than a negative variance of a return link data rate when aggregating negative variances for the different performance metrics.

In some aspects, the aggregated negative variances of the different performance metrics may be obtained for different periods of time. For example, metrics for a vessel being monitored may be tracked as the vessel proceeds along its travel route, resulting in a time series of metrics. A corresponding time series of metrics may be obtained for the similar travel routes. In some aspects, the monitored metrics and similar travel route metrics may be correlated to a start time of the respective flights, such that metrics collected at similar elapsed times into the trips are compared. In some aspects, one or more of the functions discussed above with respect to block 320 may be performed by the alert generator 232, in conjunction with at least the electronic hardware processor 202, both of which are discussed above with respect to FIG. 2.

In block 325, an anomaly in the communication service is determined based on the comparison. For example, in some aspects that aggregate negative variances as described above, an anomaly may be determined when the aggregated negative variances exceed a threshold. In aspects that track the aggregated negative variances in a time series, the anomaly may be detected when an accumulation of aggregated negative variance over a time window exceeds a threshold amount. For example, these aspects may determine an anomaly when the accumulated negative variances exceed a threshold for more than five minutes of the time series. Some aspects may evaluate a sliding window of performance metrics as the flight proceeds. The size of the sliding window may represent an elapsed time, for example, one (1) minute, two (2) minutes, three (3) minutes, four (4) minutes, five (5) minute, ten (10) minutes, fifteen (15) minutes, or any period of time. In these aspects, negative variances within the sliding window may be accumulated, and if the accumulated negative variances exceed an amount threshold, an anomaly may be determined to have occurred.

Some aspects may apply a filter to the negative variances before evaluating the sliding window. For example, in some aspects, a convolution filter may be applied to a time series of negative variances of either individual performance metrics or an aggregated negative variance metric from different types of metrics. The sliding window may then be evaluated against the filtered negative variances.

In some aspects, different thresholds may be used for different parameters when determining whether an anomaly is present. For example, negative variances for signal to noise ratio may be compared to a first threshold while negative variances for dropped packets may be compared to a second threshold. In some aspects, the number of negative variances exceeding their corresponding threshold may be compared to another threshold, with this comparison determining whether an anomaly is present.

In block 330, an alert may be generated in response to the anomaly. In some aspects, an alert may be generated as a network message. In some aspects, the network message may be configured to cause a network device participating in the communication service to perform a power cycle. For example, in some aspects, the message may be sent to the network access unit 140 in a format decodable by the network access unit as a power cycle command. This may cause the network access unit to reinitialize its state. In some cases, this may correct communication service issues indicated by the negative variances discussed above.

In some aspects, block 330 may generate alerts according to table 1 below. Table 1 below defines anomalies indicated by one or more performance metrics collected from a monitored flight, what those conditions may indicate (center column), and the form of an alert generated in response to the anomaly.

is configured to collect one or more metrics indicative of performance of the respective transceiver 170, modem 174, network access unit (NAU) 140, and wireless access point (WAP) 178 with which the metrics collector is associated. In some aspects, some of the metrics collected by each of the metrics collectors 180a-d may correspond, in that they are the same metrics collected at a different point in a data path of the architecture 375. For example, two or more of the metrics collectors may each determine one or more of a number of user and/or transmission control protocol (TCP) sessions established, an indication of data received and/or transmitted by the respective, a number of errors detected, at the respective transceiver 170, modem 174, network access unit (NAU) 140, or wireless access point (WAP) 178. By comparing corresponding metrics received from the two or more of the metrics collectors 180a-d, the disclosed methods and systems may isolate a root cause of an anomaly to one or more of the devices. For example, in some aspects of block 330, discussed above with respect to FIG. 3A, if a number of TCP sessions at the NAU is greater than a number of TCP sessions registered at the modem 174, a NAU restart may be needed. Thus, block 330 may generate a network message to the NAU indicating the NAU should perform a restart operation.

TABLE 1

| Anomaly | Possible Cause | Alert |
| --- | --- | --- |
| # of accelerated packets = 0 | AccelClient process on modem may be in a bad state | Send command to reset acceleration client on modem 174 |
| SNR below a threshold | Antenna pointing error | Trigger antenna repointing algorithm in modem 174 |
| Session counts on modem increasing while FL/RL/Combined rates are constant/decreasing | Back Office Error to register PEDs | Alert NOC to fix back office operations |
| Modem ledState = Fault, umacState = Online and fl/dl data rates ~0 | Link between NAU 140 and modem 174 has been shutdown | Alert NOC and reset modem |
| PED take rate below a threshold | Issue with the WAP 178 or the NAU 140 | Identify pattern of the anomaly using other metrics and report to NOC. Once this error signature is associated to the malfunction of the WAP with a high confidence level, this resolution process decided by the NOC can be automated |

In some aspects, an alert may be generated as one or more of an email, text or network management service (NMS) alert.

Figure 3B:
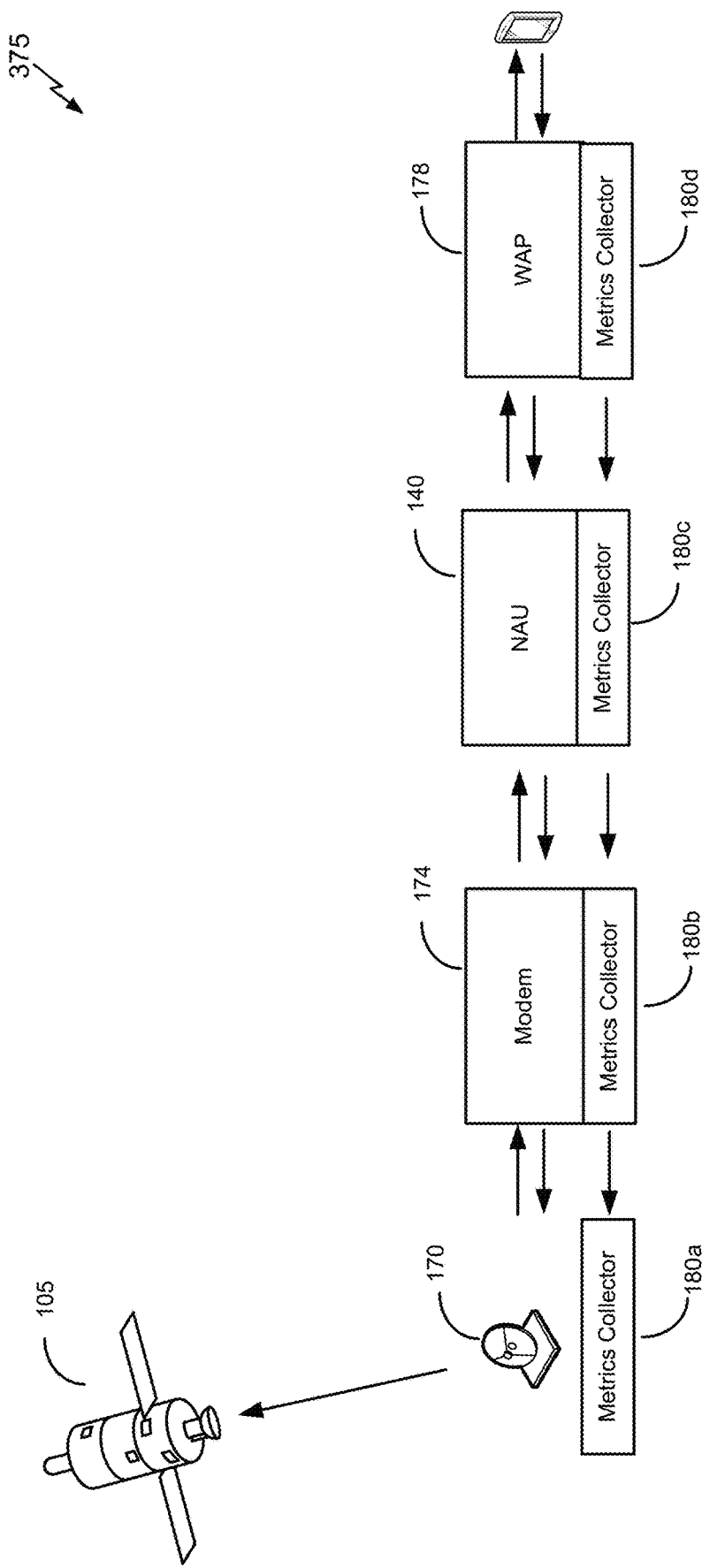
FIG. 3B shows a collection architecture for metrics associated with a communication service on a monitored vessel.

In some aspects, process 300 may isolate a particular network equipment component as a root cause of a problem from a plurality of network equipment components providing the communication service to the monitored flight. Such a process is shown with respect to FIG. 3B as discussed below:

FIG. 3B shows a collection architecture for metrics associated with a communication service on a monitored vessel. The architecture 375 shows the transceiver 170, modem 174, network access unit (NAU) 140, and wireless access point (WAP) 178 also shown in FIG. 1 above. FIG. 3B shows that each of the transceiver 170, modem 174, network access unit (NAU) 140, and wireless access point (WAP) 178 include a metrics collector 180a-d respectively. Each metrics collector In some aspects, one of the metric collectors 180a-d may provide data directly indicating a problem with the associated device (without reference to metrics from other devices). For example, in some aspects, metrics relating to a dynamic host configuration protocol (DHCP) configuration of a device may be provided by one or more of the metrics collectors 180a-d. In some aspects, one of these DHCP metrics may indicate a DHCP configuration state. Some aspects may determine that a device should be reset based on its DHCP configuration state. Thus, these aspects may transmit a network message indicating the device should be reset and/or restarted in response to particular DHCP configuration states.

In some aspects, one or more of the functions discussed above with respect to block 330 may be performed by instructions in the alert generator 232, discussed above with respect to FIG. 2.

FIG. 4 is an exemplary data table that may be included in the metrics database 245 illustrated in FIG. 2. The data table 400 may be used by the similarity detector 220 to identify travel routes similar to a vessel being monitored, for example, as discussed above with respect to block 310 of FIG. 3. The data table 400 is just an example of characteristics that may be maintained relating to historical travel routes and/or current travel routes being monitored. In some aspects, more or fewer of the parameters illustrated in FIG. 4 may be utilized by the disclosed methods and systems.

The table 400 shows travel route characteristics including a source of the travel route 402a, a destination of the travel route 402b, a departure date and time of the travel route 402c, a length of the travel route 402d, a type of vessel used for the travel route 402e, a type of network equipment utilized to provide the communication service along the travel route 402f, and an operator of the travel route 402g, such as an airline.

In some aspects, travel routes similar to a monitored vessel's travel route may be identified from a set of similar historical travel routes stored in the table 400, illustrated as travel routes 404a-f. In some aspects, a similarity function may be implemented for each of the characteristics 402a-g. For example, a similarity function for the source characteristic 402a or the destination characteristic 402b may compute a physical distance between a source 402a or destination 402b of one of the historical travel routes 404a-f and a source or destination respectively of a monitored vessel's travel route. A similarity score returned by the function and used when determining whether a travel route is similar to a monitored vessel's travel route may then be based on the physical distance.

A similarity function for the length characteristic 402d may be based on a difference in duration between a historical travel route 404a-f and a scheduled total duration of a monitored vessel's travel route. A similarity function for the vessel type characteristic 402e may be based on one or more of an aircraft manufacturer, type, and sub-type of the aircraft used for the monitored flight and a historical flight 404a-f. For example, a Boeing 737 and a Boeing 747 may be considered more similar than a Boeing 737 and Airbus A320 in some aspects. As another example, a Boeing 737-800 may be considered more similar to a Boeing 737-700 than to a Boeing 737-100. A similarity function for the equipment type characteristic 402f may operate similarly, considering one or more of a network equipment manufacturer, model number, and operator serial number when computing its similarity score. A similarity function for the operator characteristic 402g may consider one or more of a holding company, parent company, or affiliate company of the operator of the historical flights 404a-f and the flight being monitored.

In some aspects, similarity scores of the characteristics of the historical flights 404a-f and the flight being monitored may be combined and compared, for example, using nearest neighbor analysis or k-means clustering to identify flights most similar to the flight being monitored, as described below.

FIG. 5 shows a metrics table 502a including metrics that may be determined by the compute resources of the data center 170 discussed above. The table 502a may represent exemplary information stored and/or read from the database 245 of FIG. 2 during a process of looking for and potentially detecting anomalies as performed by the disclosed methods and systems. The table 502a shows that in an exemplary embodiment, at least four performance metrics may be determined to facilitate identification of anomalies along a monitored vessel's travel route. Data for the monitored vessel is shown in row 510. In particular, table 502a shows that a signal to noise ratio metric 535a, a number of dropped packets metric 535b, a number of accelerated packets metric 535c, and a number of personal electronic devices metric 535d are computed for monitored vessel (MV) 510. This information may be based on information received from a network access unit 140 on the monitored vessel in some aspects.

In the exemplary embodiment, these metrics are also computed for travel routes similar to monitored vessel's travel route, as shown in row 510, shown as similar route metrics 515a-c. The similar routes may be identified in block 310 of FIG. 3 as discussed above. Note that the metrics for the historical routes may have been collected at some time in the past, but may be stored in the database 245 for use in anomaly detection by the disclosed systems and methods. The computer resources of the data center 170 may aggregate the metrics associated with the similar routes, for example, by averaging the signal to noise ratio metrics 535a for each of the routes 515a-c to compute the aggregated similar route (ASR) metric for the SNR metrics 535a, shown in table 502a as 531a. Similarly, the dropped packets metrics 535b for each of the similar routes 515a-c may be averaged or a median may be determined to generate metric 531b. Metric 531c may be generated by averaging or finding a median of the accelerated packet metrics 535c for similar routes 515a-c. Metric 531d may be generated by averaging or finding a median of the PEDs metrics 535d for similar routes 515a-c.

Table 502a also shows that negative variance metrics 536a-d may be determined based on differences between the aggregated metrics 531a-d and corresponding metrics (in the same column of table 502a) for the monitored vessel, the performance metrics for which are provided in row 510 as metrics 511a-d. For example, negative variance metrics 536a-d may be determined based on metrics 511a-d and metrics 531a-d respectively. A negative variance may represent a relationship between a performance metric for the monitored vessel's data of row 510 and a mean/median for a corresponding metric for similar routes indicating the monitored vessel is experiencing worse communication service performance than the historical average/median for similar routes. In some aspects, a negative variance indication may be provided for each of the metrics 535a-d tracked by the embodiment. As shown in table 502a, row 508 includes a negative variance indication (NVI) 508 for each of the metrics 535a-d. For example, the NVI indicator 508a (shown" as "−") indicates that a negative variance occurs when a signal to noise ratio of the monitored vessel of row 510, represented by SNR-1 511a, is below a mean/median signal to noise ratio of the similar routes of rows 515a-c, which may be represented by SNR-Agg 531a. NVI indicator 508b (shown" as "+") shows that a negative variance occurs when a number of dropped packets of the monitored vessel of row 510, represented by DP-1 511b, is above a number of dropped packets of similar routes of rows 515a-c, represented by DP-Agg 531b. NVI indicator 508c (shown" as "−") indicates that a negative variance occurs when a number of dropped accelerated packets of the monitored vessel of row 510, represented by AP-1 511c, is below a number of accelerated packets of similar routes of rows 515a-c, represented by AP-Agg 531c. NVI indicator 508d (shown" as "−") indicates that a negative variance occurs when a number of PEDs of the monitored vessel of row 510, represented by PED-1 511*d*, is below a number of PEDs of similar routes of rows 515*a-c*, represented by PED-Agg 531*d*.

An aggregated negative variance metric 541 may be determined based on metrics of different types 536*a-d*. The aggregation may sum metrics 536*a-d* or perform another mathematical operation to generate the aggregated negative variance metric 541.

FIG. 5 also shows additional tables 502*b-c*, which may be structured similarly to table 502*a*, discussed above.

In some aspects, the methods and systems disclosed herein may determine an anomaly based on a time series of the metrics shown in table 502*a* computed over different periods of time. For example, in an exemplary embodiment, table 502*a* may represent metrics collected at one minute into the monitored vessel's trip (and similar trips using similar travel routes), table 502*b* may represent metrics collected at 5 minutes into the monitored vessel's trip (and similar vessels on similar travel routes), table 502*c* may represent metrics collected at 10 minutes into the monitored vessel's trip (and similar vessels on similar travel routes). Also of note is that metrics from a monitored vessel and those of a similar travel route may correspond at similar time offsets into the respective trips. Thus, for example, metrics collected at 5 minutes into the monitored vessel's travel may be compared to metrics collected at 5 minutes into the similar vessel's travel on a similar route, and so on.

Figure 6:
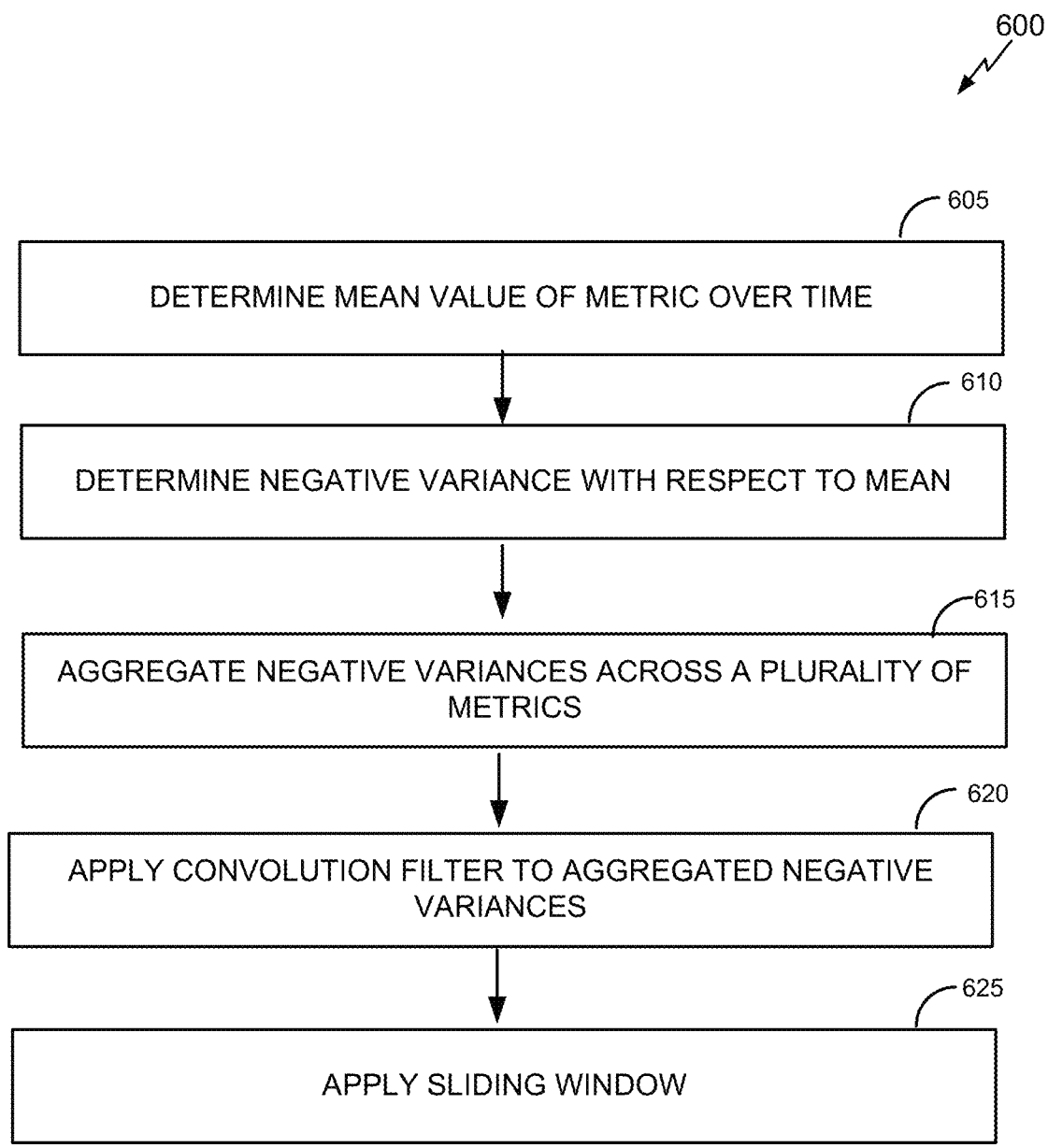
FIG. 6 is a flowchart showing an exemplary embodiment for aggregating metrics and determining whether an anomaly exists based on the metrics.

FIG. 6 is a flowchart showing an exemplary embodiment for aggregating metrics and determining whether an anomaly exists based on the metrics. In some aspects, process 600 discussed below with respect to FIG. 6 may be performed by instructions in one or more of the metric aggregator 224, and the anomaly detector 230. For example, in some aspects, blocks 610 and 615 may be performed by the metric aggregator 224, and blocks 620 and 625 may be performed by the anomaly detector 230 is some aspects.

In block 605, a mean value of a performance metric is determined over time. In some aspects, the mean value is for a plurality of equivalent performance metrics from historical travel routes that are similar to a monitored vessel's travel route. The similar travel routes may be identified as discussed above with respect to FIG. 4 and/or block 310 of FIG. 3. For example, in some aspects, block 605 may determine a mean value for one or more of a forward link and/or return link data rate, an indication of a number of dropped packets over time, an indication of a number of accelerated packets over time, a number of personal electronic devices and/or sessions served by a communications service over the travel route, and a signal to noise ratio of a return link and/or forward link signal used to provide a communications service on the historical travel routes. Any one or more of metrics 531*a-d* discussed above with respect to FIG. 5 are examples of the mean value that may be determined in block 605.

Figure 7A:
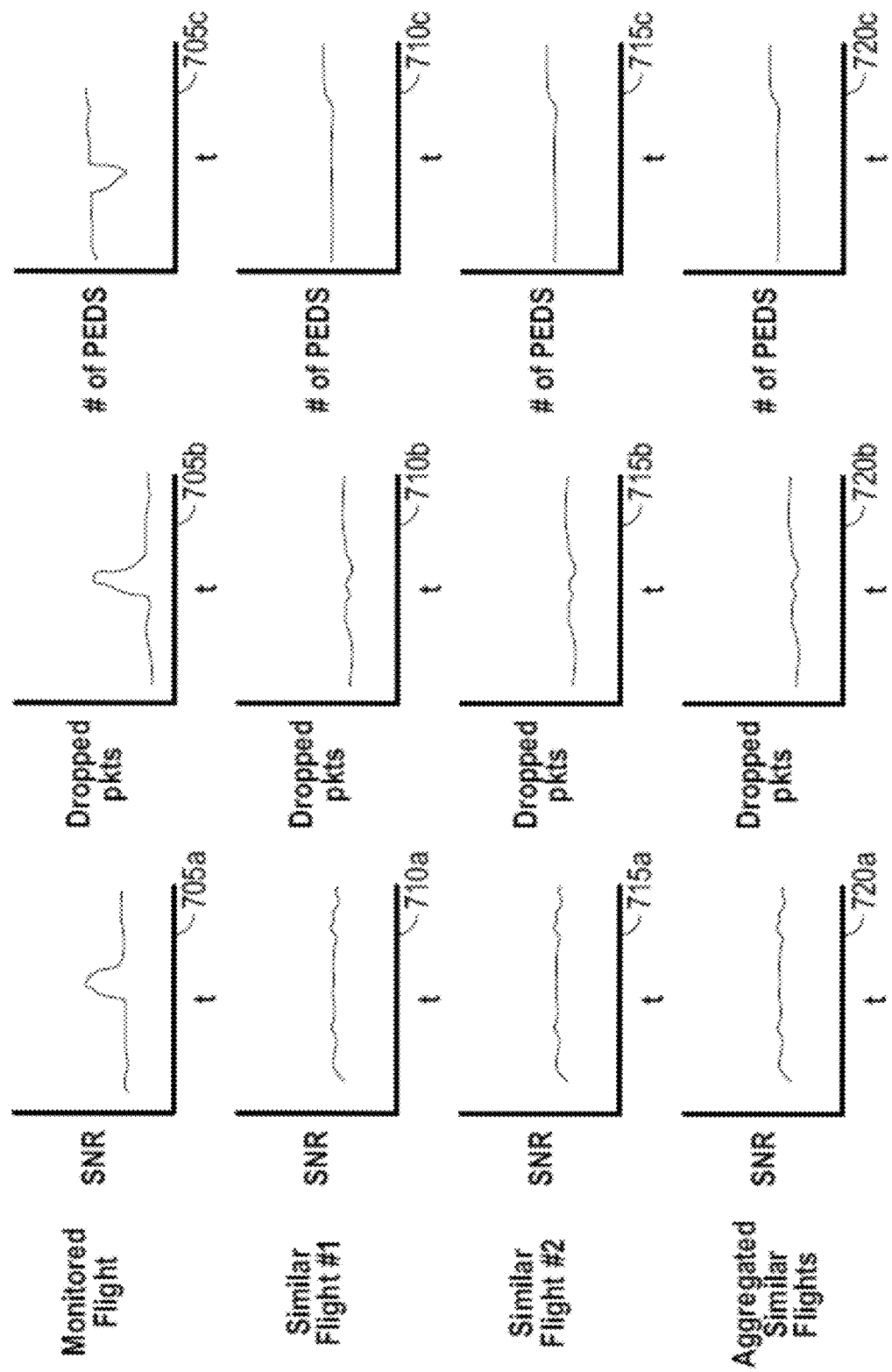
FIG. 7A is a set of graphs showing time series for communication service performance metrics for a monitored travel route of a vessel and a plurality of similar travel routes for other vessels.

Each of these mean values may be computed for multiple corresponding periods of time within each of the historical travel routes, resulting in a time series of values for each of the metrics used in a particular embodiment. An example of mean value creation of a time series is shown in FIG. 7A. Graphs 710*a-c* and 715*a-c* show exemplary time series for three different metrics (signal to noise ratio, # of dropped packets, and # of PEDs) for two different similar flights. These exemplary time series may be averaged, or a median taken for each corresponding data point in graphs 710*a* and 715*a* to generate graph 720*a*. Similarly, the time series shown in graphs 710*b* and 715*b* may be aggregated (via either a mean or median of corresponding data points) to generate an aggregated time series shown in graph 720*b*. The time series shown in graphs 710*c* and 715*c* for a number of personal electronic devices metrics for similar flights may be aggregated to generate a time series shown in graph 720*c*.

In block 610, a negative variance is determined with respect to the mean. For example, in some aspects, values for a single performance metric of a communication service provided to a monitored vessel may be obtained over multiple points in time, resulting in a time series for the metric for the monitored vessel. A similar time series may be obtained for other performance metrics as well. These one or more performance metrics may be one or more of a forward link and/or return link data rate, an indication of a number of dropped packets over time, an indication of a number of accelerated packets over time, a number of personal electronic devices and/or sessions served by a communications service along the travel route of the vessel, and a signal to noise ratio of a return link and/or forward link signal used to provide the communications service. Each time series for the monitored vessel may be correlated with a corresponding time series for the similar travel routes of other vessels determined in block 605. The correlation may be with respect to an elapsed time into the respective travel routes, as discussed above.

A negative variance may represents a relationship between a performance metric of the monitored vessel and a corresponding mean/median performance metric for the similar travel routes of other vessels, as computed in block 605. When a negative variance is present, the monitored vessel has worse network performance than the aggregated performance of the similar flights. For example, in some aspects, a data rate of a monitored vessel being below a data rate of a similar historical travel route of another vessel at a similar elapsed time into the route(s) may represent a negative variance, whereas a number of dropped packets of a monitored vessel being above a number of dropped packets of the similar historical travel route(s) as a similar elapsed time into the route may also represent a negative variance. The process 600 may utilize negative variances to detect anomalies because negative variances prevent adverse effects caused by periods of time when a monitored vessel's performance may actually exceed a typical or average experience of historically similar travel routes by other vessels. Customers may not fully appreciate conditions where their performance was better than average for a majority of the travel, but suffered an outage for 15 minutes of the travel for example. While their performance may be above average in this example scenario, the customer's impression may over represent the negative variance portion of the travel experience. Thus, the disclosed methods and systems may also utilize negative variances when determining whether an anomaly has occurred. Additionally negative variances may be indicative of problems with network equipment for example, whereas positive variances may be more indicative of light loading of a communications service.

Figure 7B:
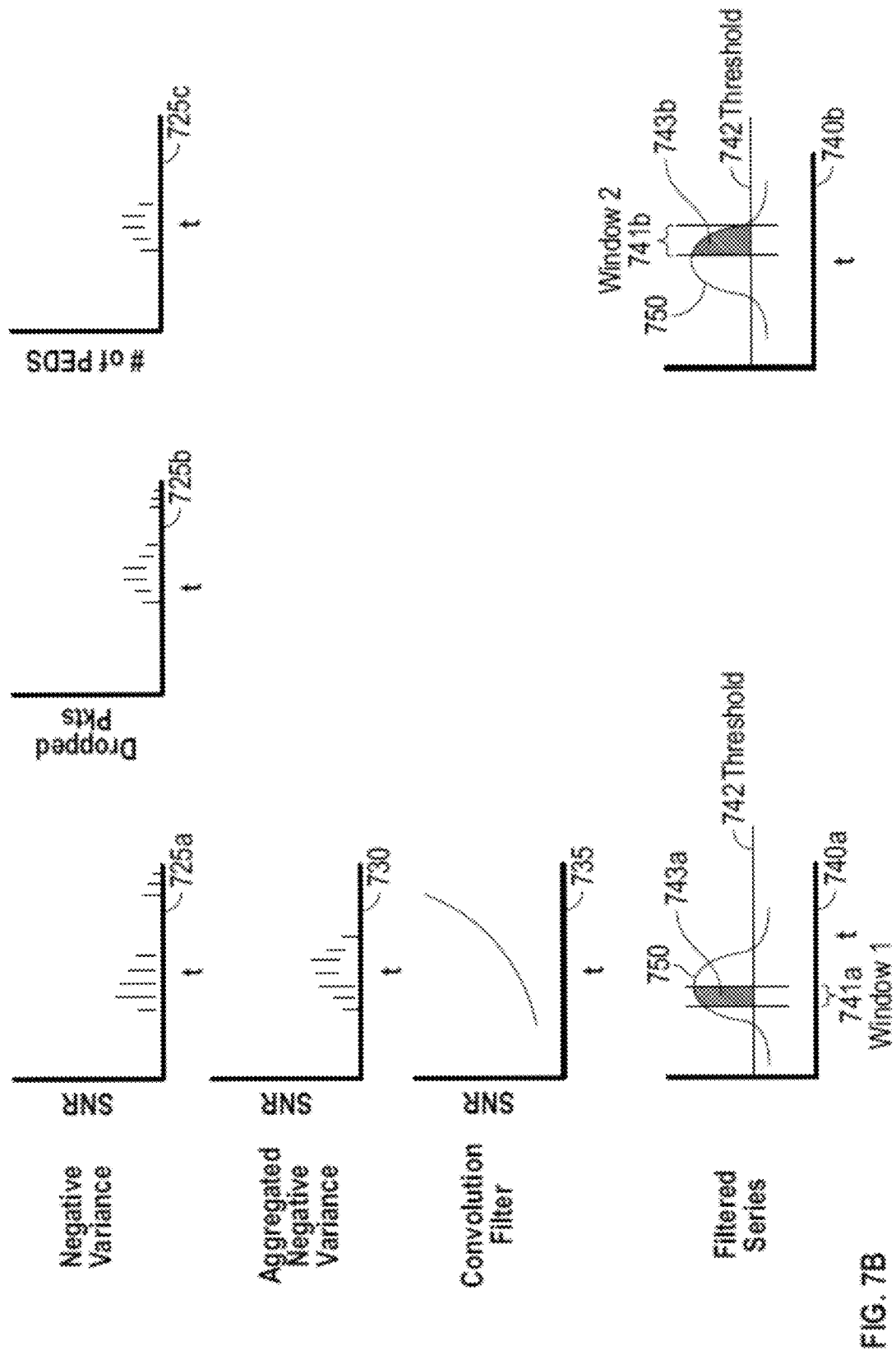
FIG. 7B is a set of graphs showing time series for negative variances of a monitored vessel's travel route when compared to historically similar travel routes.

FIG. 7A shows graphs 705*a-c*, which are time series of different performance metrics for a communication service provided to a monitored vessel. While the examples of FIGS. 7A-B show data from aircraft flights, the disclosed methods and systems contemplate use of the disclosed techniques to travel performed by other types of vessels, such as cars, buses, trains, ships, and the like. The time series of graphs 705*a-c* may be compared to the time series for the corresponding aggregated metrics of historical travel routes, shown in graphs 720a-c respectively. The result may be graphs 725a-c of FIG. 7B, showing negative variance time series.

In block 615, negative variances across a plurality of different types of metrics are aggregated. For example, in some aspects, one or more of metrics 535a-535d of FIG. 5 are aggregated. In some aspects, this aggregation includes aggregation along time series of the one or more metrics 535a-535d. An exemplary result of block 615 is shown in FIG. 7B, where the negative variance time series for different metrics in graphs 725a-c may be aggregated to form a single aggregated negative variance time series 730 in some aspects. Negative variances across different types of metrics may be aggregated in the disclosed methods and systems because a network performance issue may be indicated by a reduction in performance reflected by the different types of metrics. Observing fewer performance metrics (and their associated negative variances) may not fully reflect the user's experience, and potential anomalies that may be experienced by a communications service. By aggregating anomalies across multiple different types of metrics, a more comprehensive measurement of the user experience may be provided.

In block 620, a convolution filter is applied to the time series of aggregated negative variances. In some aspects, the filter may be a finite rising exponential function of length T, with T less than the maximum time value in the series shown by graph 730, or less than a duration of the sliding window discussed below in block 625. In some aspects, T may be set based on a temporal sensitivity and dependence of a degradation in time of one or more performance measurements. The applied filter may convolve with the temporal variance data to magnify situations where continual degradation of service exists as compared to irregular drops in the parameter values. In some aspects, this may reduce false positives in that the filter may smooth the distribution of negative variances over time, and thus, short bursts of negative variance that may have otherwise exceeded an alert threshold may be smoothed to lower values and distributed over a longer period of time by the filter. In some aspects, the convolution function may be expressed as:

$$K_t = (1+\Delta)^\gamma$$

where:
$K_t$ is a value of the convolution function at a time t
$\Delta$ is a tuning constant that helps determine the marginal sensitivity applied to samples of metrics distributed across consecutive time steps. Values that may work well include 0.1, 0.3, or 0.5, depending on the environment.
$\gamma$ is a tuning constant that helps determine a period of time impacted by a negative variance. Experimental values that may work well include a range between 5-20
The convolution filter may be applied to the time series as $$X_t = M_t * K_t$$

where:
$X_t$ is a time series resulting from block 620
$M_t$ is a time series resulting from block 615
$K_t$ is the convolution filter time series
An exemplary result of block 620 is also shown in FIG. 7B, where the convolution filter shown in graph 735 is applied to the aggregated negative variance time series in graph 730, to generate a time series shown in graphs 740a-b as series 750.

In block 625, a sliding window is applied to the filtered time series 750. For example, in some aspects, block 625 may determine an amount that the time series 750 exceeds a threshold within the sliding window 741a of FIG. 7B. For example, if there are n data points of the time series 750 within the sliding window 741a, block 625 may calculate an amount each of n data points exceed the thresholds (for example, threshold 742 of FIG. 7B). The n amounts may then be aggregated as 744a in FIG. 7B. If the n aggregated amounts exceed the amount threshold 742, some aspects may determine an anomaly exists within the sliding window 741a. Otherwise, a second sliding window 741b may be evaluated to another location of the time series 750, and a new aggregated amount 743b computed and compared to the amount threshold.

An example of this approach can be seen in FIG. 7B. A first sliding window 741a of the time series 750 is shown. A threshold 742 is also shown. Some aspects may aggregate the region above the threshold 742, shown as 743a in graph 740a. This amount may be compared to the amount threshold discussed above to determine whether an anomaly occurred. In the example of FIG. 7B, area 743a is not large enough to determine an anomaly has occurred (the amount is not above the amount threshold). A second sliding window 741b of time series 750 is also shown in graph 740b. Within the sliding window 741b, a second area 743b above the threshold 742 is also shown. In the illustrated example, area 743b may exceed the amount threshold, causing an anomaly to be detected by the disclosed systems and methods.

In some aspects, the threshold 742 may be dynamically adjusted. For example, in some of these aspects, a moving average of the area 743a-b may be maintained across a plurality of monitored flights. The threshold may be set such that a predetermined percentage of flights qualify as anomalous flights at any one time. For example, the threshold may be set to identify the top 5%, 4%, 3%, 2%, 1%, 0.5%, 0.1% or any percentage of flights within a predetermined time period (such as 10 minutes, 15 minutes, 30 minutes, etc). By dynamically setting the threshold, workload of a network operations center may be managed. For example, the dynamic adjustment algorithm may be tuned to provide no more than a predetermined number of alerts to a network operations control center per a period of time (for example, per hour), regardless of the current performance of the communication service. In some aspects, this tuning may be changed based on a staffing level of the network operations center for example.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:
1. A method, comprising:
obtaining a first performance metric for a network communication service provided along a monitored travel route of a transport vessel;
identifying a set of previous travel routes similar to the monitored travel route;
obtaining a second performance metric for the network communication service for the set of similar previous travel routes;
determining that an anomaly is present in the provided network communication service if a variance between the second performance metric and the first performance metric satisfies a threshold for a negative variance and that the anomaly is not present if the variance does not satisfy the threshold for the negative variance; and transmitting, if the anomaly is present, a message to perform an operation for improving the first performance metric to a device associated with the network communication service.

2. The method of claim 1, further comprising:
refraining, if the anomaly is not present, from transmitting the message to perform the operation for improving the first performance metric.

3. The method of claim 1, further comprising:
obtaining a first plurality of performance metrics, including the first performance metric, for the network communication service; and
obtaining a second plurality of performance metrics for each similar previous travel route of the set of similar previous travel routes, wherein obtaining the second performance metric comprises aggregating one or more of the second pluralities of performance metrics to generate the second performance metric.

4. The method of claim 3, wherein determining that the anomaly is present or that the anomaly is not present comprises:
determining whether one or more variances between the second performance metric and one or more performance metrics of the first plurality of performance metrics satisfies the threshold for the negative variance.

5. The method of claim 1, further comprising:
obtaining a first plurality of performance metrics including the first performance metric for the network communication service, wherein the first plurality of performance metrics is a first time series of performance metrics; and
obtaining a second plurality of performance metrics including the second performance metric for the set of similar previous travel routes, wherein the second plurality of performance metrics is a second time series of performance metrics,
wherein determining that the anomaly is present or that the anomaly is not present comprises determining whether one or more variances between one or more performance metrics in the first plurality and the respective one or more performance metrics in the second plurality satisfies one or more thresholds for the negative variance.

6. The method of claim 1, further comprising:
obtaining a first plurality of performance metrics including the first performance metric for the network communication service, wherein the first plurality of performance metrics is a first time series of performance metrics;
obtaining a second plurality of performance metrics including the second performance metric for the set of similar previous travel routes, wherein the second plurality of performance metrics is a second time series of performance metrics;
aggregating, based on a determination that one or more variances between one or more performance metrics in the first plurality and the respective one or more performance metrics in the second plurality satisfy the threshold for the negative variance, the one or more variances over a time window associated with the first time series and second time series; and
determining whether the aggregated variances over the time window exceed a second threshold, wherein determining that the anomaly is present comprises determining whether the aggregated variances over the time window exceed the second threshold.

7. The method of claim 1, wherein the negative variance indicates a worse communication service of the monitored travel route relative to the set of similar previous travel routes.

8. The method of claim 1, wherein determining that the anomaly is present comprises determining that the variance between the second performance metric and the first performance metric satisfies the threshold for the negative variance for a period of time.

9. The method of claim 1, wherein the threshold is determined based at least in part on a third performance metric for the network communication service for the set of similar previous travel routes.

10. The method of claim 1, wherein identifying the set of previous travel routes similar to the monitored travel route is based on a similarity between one or more travel route characteristics of the set of previous travel routes and the monitored travel route.

11. The method of claim 10, wherein the one or more travel route characteristics comprise one or more of a time of day, a day of a week, a day of a month, a month, an operator, and a route.

12. The method of claim 10, further comprising:
identifying a second set of previous travel routes similar to the monitored travel route based on a similarity between one or more travel route characteristics of the second set of previous travel routes and the monitored travel route, wherein the one or more travel route characteristics of the second set of previous travel routes are different than the one or more travel route characteristics of the set of previous travel routes;
obtaining a third plurality of performance metrics including the second performance metric for the second set of similar previous travel routes;
generating first intermediate performance metrics for the set of previous travel routes;
generating second intermediate performance metrics for the second set of previous travel routes; and
combining the first and second intermediate performance metrics to generate the second performance metric.

13. The method of claim 12, further comprising:
assigning a first weight to the first intermediate performance metrics; and
assigning a second weight to the second intermediate performance metrics, wherein the first and second intermediate performance metrics are combined based on the first weight and the second weight.

14. The method of claim 13, further comprising:
determining the first weight based on the one or more travel route characteristics of the set of previous travel routes; and
determining the second weight based on the one or more travel route characteristics of the second set of previous travel routes.

15. The method of claim 1, wherein:
identifying previous travel routes similar to the monitored travel route comprises identifying previous travel routes based on one or more of a travel route path and a travel route time of the monitored travel route and the previous travel routes.

16. An apparatus, comprising:
an electronic hardware processor;
an electronic hardware memory, operably connected to the electronic hardware processor, and configured to store instructions, that when executed, cause the electronic hardware processor to:

obtain a first performance metric for a network communication service provided along a monitored travel route of a transport vessel;
identify a set of previous travel routes similar to the monitored travel route;
obtain a second performance metric for the network communication service for the set of similar previous travel routes;
determine that an anomaly is present in the provided network communication service if a variance between the second performance metric and the first performance metric satisfies a threshold for a negative variance and that the anomaly is not present if the variance does not satisfy the threshold for the negative variance; and
transmit, if the anomaly is present, a message to perform an operation for improving the first performance metric to a device associated with the network communication service.

17. The apparatus of claim 16, wherein the electronic hardware memory stores further instructions that configure the electronic hardware processor to:
refrain, if the anomaly is not present, from transmitting the message to perform the operation for improving the first performance metric.

18. The apparatus of claim 16, wherein the electronic hardware memory stores further instructions that configure the electronic hardware processor to:
obtain a first plurality of performance metrics, including the first performance metric, for the network communication service; and
obtain a second plurality of performance metrics for each similar previous travel route of the set of similar previous travel routes, wherein the instructions that configure the electronic hardware processor to obtain the second performance metric comprise instructions that configure the electronic hardware processor to aggregate one or more of the second pluralities of performance metrics to generate the second performance metric.

19. The apparatus of claim 18, wherein the instructions that configure the electronic hardware processor to determine that the anomaly is present or that the anomaly is not present comprise:
instructions that configure the electronic hardware processor to determine whether one or more variances between the second performance metric and one or more performance metrics of the first plurality of performance metrics satisfies the threshold for the negative variance.

20. The apparatus of claim 16, wherein the electronic hardware memory stores further instructions that configure the electronic hardware processor to:
obtain a first plurality of performance metrics including the first performance metric for the network communication service, wherein the first plurality of performance metrics is a first time series of performance metrics; and
obtain a second plurality of performance metrics including the second performance metric for the set of similar previous travel routes, wherein the second plurality of performance metrics is a second time series of performance metrics,
wherein the instructions that configure the electronic hardware processor to determine that the anomaly is present or that the anomaly is not present comprise instructions that configure the electronic hardware processor to determine whether one or more variances between one or more performance metrics in the first plurality and the respective one or more performance metrics in the second plurality satisfies one or more thresholds for the negative variance.

21. The apparatus of claim 16, wherein the electronic hardware memory stores further instructions that configure the electronic hardware processor to:
obtain a first plurality of performance metrics including the first performance metric for the network communication service, wherein the first plurality of performance metrics is a first time series of performance metrics;
obtain a second plurality of performance metrics including the second performance metric for the set of similar previous travel routes, wherein the second plurality of performance metrics is a second time series of performance metrics;
aggregate, based on a determination that one or more variances between one or more performance metrics in the first plurality and the respective one or more performance metrics in the second plurality satisfy the threshold for the negative variance, the one or more variances over a time window associated with the first time series and second time series; and
determine whether the aggregated variances over the time window exceed a second threshold, wherein the instructions that configure the electronic hardware processor to determine that the anomaly is present or that the anomaly is not present comprise instructions that configure the electronic hardware processor to determine whether the aggregated variances over the time window exceed the second threshold.

22. The apparatus of claim 16, wherein identifying the set of previous travel routes similar to the monitored travel route is based on a similarity between one or more travel route characteristics of the set of previous travel routes and the monitored travel route.

23. The apparatus of claim 22, wherein the one or more travel route characteristics comprise one or more of a time of day, a day of a week, a day of a month, a month, an operator, and a route.

24. The apparatus of claim 22, wherein the electronic hardware memory stores further instructions that configure the electronic hardware processor to:
identify a second set of previous travel routes similar to the monitored travel route based on a similarity between one or more travel route characteristics of the second set of previous travel routes and the monitored travel route, wherein the one or more travel route characteristics of the second set of previous travel routes are different than the one or more travel route characteristics of the set of previous travel routes;
obtain a third plurality of performance metrics including the second performance metric for the second set of similar previous travel routes;
generate a first intermediate performance metric for the set of previous travel routes;
generate a second intermediate performance metric for the second set of previous travel routes; and
combine the first and second intermediate performance metrics to generate the second performance metric.

25. The apparatus of claim 24, wherein the electronic hardware memory stores further instructions that configure the electronic hardware processor to:
assign a first weight to the first intermediate performance metric; and assign a second weight to the second intermediate performance metric, wherein the instructions that configure the electronic hardware processor to combine the first and second intermediate performance metrics to generate the second performance metric comprise instructions that configure the electronic hardware processor to combine the first and second intermediate performance metrics based on the first weight and the second weight.

26. The apparatus of claim 25, wherein the electronic hardware memory stores further instructions that configure the electronic hardware processor to:
 determine the first weight based on the one or more travel route characteristics of the set of previous travel routes; and
 determine the second weight based on the one or more travel route characteristics of the second set of previous travel routes.

27. The apparatus of claim 16, wherein the instructions that configure the electronic hardware processor to identify previous travel routes similar to the monitored travel route comprise instructions that configure the electronic hardware processor to identify previous travel routes based on one or more of a travel route path and a travel route time of the monitored travel route and the previous travel routes.

* * * * *